Patented June 30, 1925.

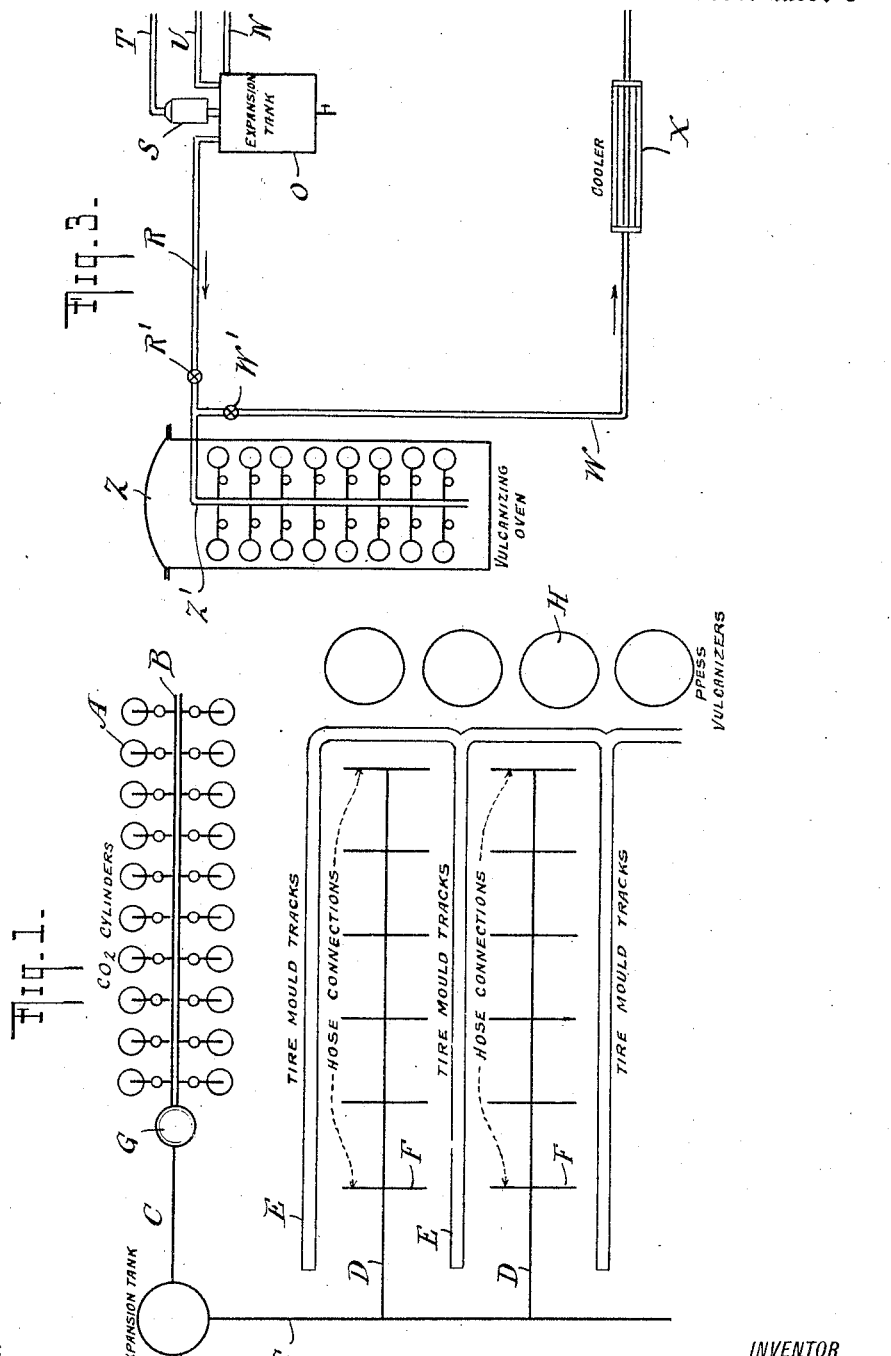

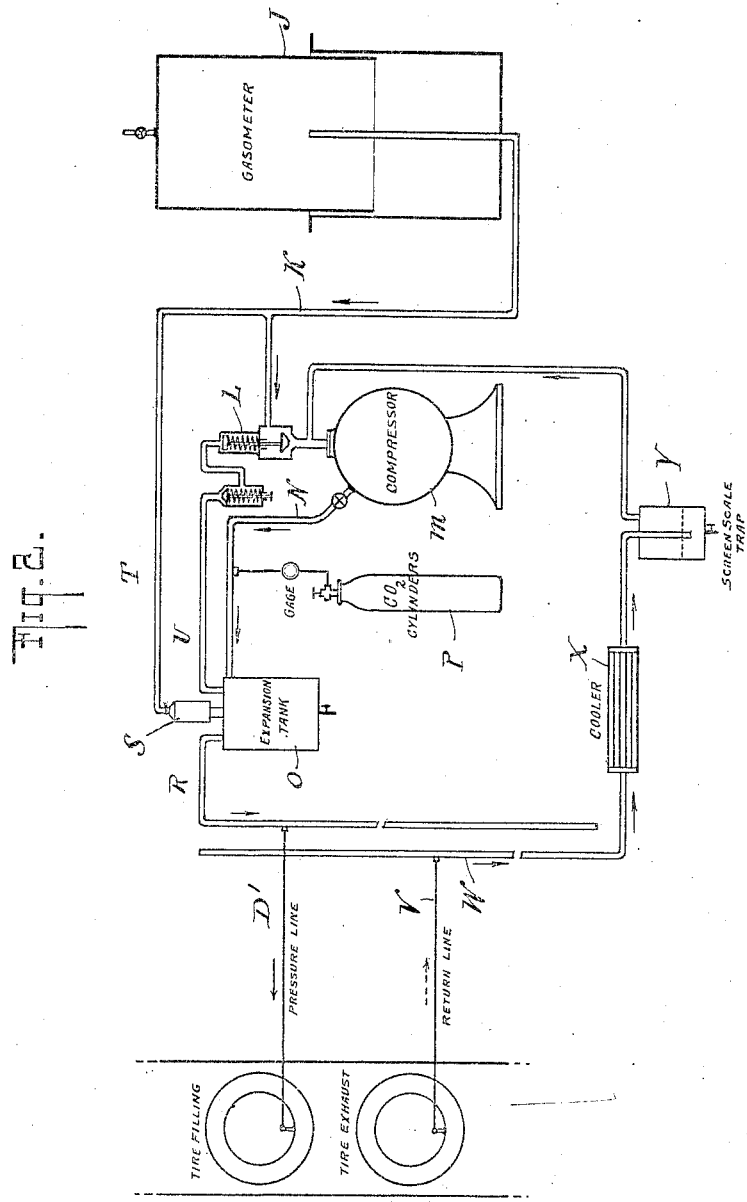

1,544,023

UNITED STATES PATENT OFFICE.

HENRY R. MINOR, OF OSSINING, NEW YORK, ASSIGNOR TO GENERAL CARBONIC CO., OF NEW YORK, N. Y., A CORPORATION OF NEW YORK.

METHOD OF CURING MOLDED RUBBER ARTICLES AND APPARATUS THEREFOR.

Application filed July 30, 1923. Serial No. 654,564.

*To all whom it may concern:*

Be it known that I, HENRY R. MINOR, a citizen of the United States, and resident of Ossining, county of Westchester, State of New York, have invented a certain new and useful Improvement in Methods of Curing Molded Rubber Articles and Apparatus Therefor, of which the following is a specification.

This invention relates to a method of curing rubber articles and, in the preferred embodiment, a method which involves the employment of substantially pure carbon dioxide as a means for treating rubber and particularly in cases where the rubber article is subjected to pressure in a mold in which rubber articles such as tires are cured. The invention further relates to the special manner and the special conditions under which the process hereinafter described is put in practice.

In the curing of rubber articles such as automobile tires or the like it is the common practice to place the uncured articles within a mold and to exert pressure upon the article to cause it to be pressed into firm contact with inner walls of the mold, and to then subject the mold to the influence of heat to vulcanize the rubber while the article is maintained under pressure. One of the standard methods of producing the pressure upon the articles within the mold is to use an expansible bag within the mold which is filled with air generally accompanied by moisture which, under the vulcanizing condition, functions as steam under pressure. The presence of steam while tending to maintain or accentuate the pressure conditions in the air bag, has, however, many objectionable features, especially because of the moisture, the stock of the air bags is rapidly deteriorated.

Many proposals have been made to overcome the difficulties inherent in the use of air or air and steam as a medium to produce the required pressure within the mold, and the substitution of inert gases, such as flue gases, nitrogen, and carbon dioxide, for the steam, has been suggested. Of these inert gases, almost all proved unsatisfactory but occasionally some promise of a fairly satisfactory result was indicated by the use of nitrogen and carbon dioxide. These gases have been recognized as probably desirable, and while many attempts have been made to utilize carbon dioxide for example, as the medium for exerting the pressure upon the air bags, these attempts have so far proven unsuccessful from a commercial standpoint, evidently as I have discovered, because of the failure to comprehend certain essentials which underlie the successful application of $CO_2$ to the rubber industry.

I have discovered that, due consideration being given to certain details such as using the $CO_2$ in substantially pure condition and free from oil or moisture, and giving proper consideration to the dimensions of the walls of the air bags and providing a suitable distributor intermediate, the source of supply of the carbon dioxide and the air bags, a process for the application of $CO_2$ as the inflating means in the manufacture of tire casings may be practiced which will be uniformly successful and will result in many advantages not heretofore known or understood. I have, for example, discovered that the migration of sulphur on the outside of the bag can be reduced by a proper application of my process. Where the bag is sufficiently thin in its walls to permit sufficient carbon dioxide to pass through, the air entrained between the outer surface of the bag and the inner surface of the shoe is partially displaced. Apparently the rubber molecules become surrounded with a film of carbon dioxide which acts to prevent contact between the sulphur migrating from the shoe and the rubber molecules of the bag. $CO_2$ apparently passes through rubber from 15 to 20 times faster than air or nitrogen and, provided the walls of the bag are not sufficiently thick to resist, the $CO_2$ can be allowed to penetrate the walls and become effective on the outer surface of the bag. The reduction in the effect of migration of sulphur on the outside of the bag is a fact not previously known and was developed by me by subjecting bags of various thicknesses to vulcanization with carbon dioxide as a filler. The fact that a bag with relatively thin walls tends to produce an advantage is also of importance from another aspect. The stock of the bag, when used with dry carbon dioxide, remains materially stronger than a similar bag when using moist air. This discovery was made as the result of vulcanizing the bags with dry $CO_2$ and moist air respectively, and then buffing off the insides and subjecting the remaining stock to tests and plotting therefrom stress-strain curves which clearly demonstrated the fact heretofore stated. This discovery enables a manufacturer to use a much lighter bag with a thinner wall, a matter of considerable commercial value.

In the curing of cord tire on an air bag, a frequent cause of failure is the looseness of the valves in the air bag or the weakening of the material about said valves. This is due to the fact that when moist air is used as an inflating medium, the stock in the bag itself is weakened. When, however, commercial carbon dioxide is used, there is a vast decrease in the number of failures about the valve. When $CO_2$ is employed a greater percentage of the rubber in the bag can be reclaimed due to the fact that the oxidation process which goes on in the presence of air and results in the destruction of a portion of the rubber on the inside of the bag cannot go on when commercial $CO_2$ is used, the presence of $CO_2$ retarding depolymerization. One of the reasons which has caused unsuccessful results in the use of $CO_2$ in the past has been the fact that each air bag was filled directly from a cylinder of the compressed gas. The cylinder, when so used, frequently froze up before the required pressure was produced within the bag, which required the cylinder to be detached from the bag and allowed to thaw out before the filling of the bag could be proceeded with, thereby causing great delay and loss of time.

It is therefore an object of this invention to provide a new and improved method for curing rubber articles, especially such as are cured within a mold, by the use of inflatable gas bags containing carbon dioxide under pressure, which will overcome the difficulties heretofore enumerated. Another object is to provide an apparatus for carrying out the method upon a practicable and commercially successful scale.

For the accomplishment of these and such further objects as will be apparent to those skilled in the art to which this disclosure appertains, the invention consists in the method and in apparatus for carrying out the method, as hereinafter described and illustrated in the accompanying drawings forming a part hereof, but it will be understood that many changes, variations and modifications may be resorted to without departing from the invention described in, and included within, the scope of the claims hereunto appended.

Referring to the drawings, Fig. 1 is a diagrammatic showing of an apparatus for supplying the carbon dioxide to a bolted mold system, from a plurality of cylinders through a distributing header; Fig. 2 is a diagrammatic showing of a further refinement of an apparatus for a bolted mold system in which the carbon dioxide is recirculated back to the source of supply for continuous re-use; Fig. 3 is a diagrammatic showing of a recirculation apparatus for use with a constant pressure system, only those parts of the apparatus which differ from what is shown in Fig. 2 being illustrated. It is understood that at the parts drawn as broken away the apparatus of Fig. 3 is the same as depicted in Fig. 2.

Referring to Fig. 1 of the drawings a plurality of cylinders A, containing compressed commercial carbon dioxide, are connected to a header B, which serves as a distributor and to which the supply line C is connected. Any desirable number of branches D may lead from the supply line C, to extend adjacent to the tire mold tracks E, and said branches are provided with suitable hose connections F which are adapted to be connected to the valves of the air bags for inflating them with the carbon dioxide. A regulator gage G is preferably interposed in the supply line, and while serving to admit the needed supply to the supply line, prevents the pressure in the supply line from exceeding a given predetermined maximum of pressure to be used in the gas bags. It is recommended also to use an expansion or storage tank O, interposed in the supply line between the header B and the branches D. The usual press vulcanizers H are provided adjacent the tire mold tracks E.

In carrying out my improved method with the apparatus shown in Fig. 1, the dimensions of the air bags are properly proportioned, according to the sizes of the tires to be vulcanized and the pressures to be used, so as to permit a substantial penetration of the carbon dioxide into the walls of the bag. As the exact dimensions of the walls of the bags will vary according to the sizes of the tires and pressures to be used, it is not possible to state herein any given size for the thickness of the walls of the bag except that they may be considerably thinner than those commonly used heretofore. When a hose connection F is connected to the valve of an air bag, which it will be understood is placed within a bolted mold containing the tire to be treated, and the carbon dioxide is admitted to the bag, it will be apparent that because of the provision of the plurality of cylinders connected to the distributor or header B only a small volume of $CO_2$ will be drawn from each cylinder and consequently the refrigerating effect will be so reduced that the freezing up of the cylinders will be entirely obviated, constant accuracy and uniformity of gas bag conditions will result, and the haphazard, variable and unreliable results of the past will be entirely overcome. After the gas bag has been inflated to the desired pressure, the mold containing the gas bag and tire is placed within the vulcanizing press and the heat is applied thereto.

The apparatus diagrammatically shown in Fig. 2 illustrates a preferred form of an apparatus in which the carbon dioxide is withdrawn from the bolted molds after the vulcanization is completed and is returned to the source of supply to be re-used. This form of apparatus consists of a gasometer J, containing a supply of $CO_2$, which is connected, as by means of the suction line K, to an unloading valve L which communicates with a compressor M. A pressure line N leads from the compressor to an expansion tank O. A supply line R leads from the expansion tank and is provided with suitable branches D' and hose connections adjacent to the tire mold tracks, in the manner shown in connection with the apparatus shown in Fig. 1, only a single branch, however, being illustrated in Fig. 2. A safety valve S, mounted on the top of the expansion tank O is connected by the pipe T to the suction line, to serve as a by-pass for the gas when the pressure in the system exceeds a predetermined amount. The pressure line has a branch U which extends to and is connected to the top of the unloading valve L to also serve as a by-pass for the gas.

Assuming that the compressor M is set in operation, the gas will be drawn from the gasometer J, through suction line K and unloading valve L, to the compressor, from which it is forced through the pressure line N to the expansion tank O. When the pressure in the pressure line leading to the expansion tank and cylinders builds up beyond a certain predetermined amount it will be transmitted through the branch U to the unloading valve L, which is set to be operated at the desired pressure so as to close the suction line and to by-pass the gas from the pressure line back to the source of supply or storage. The safety valve S is provided as an additional safeguard to prevent excessive pressure from building up and it is preferably set at the vulcanizing pressure. When the pressure in the system exceeds this value the gas will pass through the safety valve and through the pipe T back to the gasometer. The bolted mold containing the air bag to be inflated is connected to the branch D' and after being inflated to the proper pressure the air bag is disconnected and the mold is removed to the vulcanizing press. After vulcanization, the branch V, of return line W which is connected to the suction side of the compressor, is connected to the valve of the air bag and the gas is exhausted from the bag and returned to the system for re-use. A cooler X and a screen scale trap Y are preferably interposed in the return line. A reserve supply of $CO_2$ consisting of a battery of cylinders is shown at P as maintained in connection with the line N.

The apparatus shown in Fig. 3 is similar in its main essentials to that shown in Fig. 2 with the exception that a plurality of tires are placed within a vulcanizing oven Z, within which is provided a manifold Z' connected with the valves of the air bags. In the apparatus shown in Fig. 3 the air bags of the tires within the vulcanizing oven are kept connected with the system during the vulcanization, the valve R' of the supply line R being maintained open and the valve W' of the return line W being closed. When the vulcanization is completed the valve R' of the supply line is closed and the valve W' of the return line is opened, thus causing the gas to be withdrawn from the air bags and returned to the system for reuse.

I have discovered that in addition to the details heretofore discussed it is of considerable importance with the re-circulation systems, in order to prevent damage to the rubber of the air bags that the presence of entrained oil from the compressor be avoided and I therefore recommend the use of glycerine for lubricating the compressor as the glycerine not only repels oil and has no injurious effect upon the air bags but also acts as a protective coating for the air bags to prevent oxidation thereof.

It will be noted by referring to the drawing that in each form of the apparatus as disclosed I provide a constantly maintained major source of supply which in Fig. 1 is the plurality of cylinders A and in Figs. 2 and 3, gasometer J or any other suitable large receptacle from which major source a minor volume is withdrawn into the expansion tank O. The pressure within the tank is maintained constant and the amounts of carbon dioxide withdrawn from said minor volume for the vulcanizing operations are simultaneously replenished from the major source by amounts equivalent to that withdrawn therefrom. The filling of the molds is in each case accomplished by drawing from a reservoir or supply of fixed pressure appropriate to the requirements in the mold, a feature which is regarded as of considerable importance.

Various changes in the specific details shown and described may be made within the scope of the claims without departing from the nature of my invention. Thus, for example, while I have referred to $CO_2$ as the preferred gas it is apparent that the recirculation system and the distribution of gas from a major supply through a minor supply, and then to the gas bags and numerous other details are equally applicable where a gas such as commercially pure nitrogen is used.

The expansible rubber bag when receiving its initial cure, and before it is used within the mold as pressure means is to best advantage first subjected by itself to the carbon dioxide treatment in order that it may be permeated by the gas. This preliminary treatment of the bag is not essential inasmuch as the bag would in any event receive such treatment during its initial use in the mold as pressure means but is desirable since it thereby initially puts the bag in the proper condition for use in the mold.

I claim:—

1. The method of vulcanizing rubber articles which consists in maintaining constantly a major supply of a non-oxygen gas, withdrawing from said supply, and separately therefrom, confining a minor volume thereof, maintaining said minor volume under a constant predetermined pressure, utilizing withdrawals from said minor volume for the vulcanizing operation and simultaneously replenishing said minor volume with an amount of gas equivalent to that withdrawn therefrom for said vulcanizing uses.

2. The method of vulcanizing articles of rubber which consists in placing an expansible bag adjacent the article within a mold, introducing carbon dioxide in a substantially dry condition and free from ingredients injurious to rubber into the said bag from a minor storage supply of carbon dioxide which, in turn, is constantly replenished from a source of supply of always considerably greater volume than the amount required to fill said bag, inflating the air bag with said carbon dioxide to a predetermined pressure to cause said bag to force the article against the inner sides of the mold and applying vulcanizing heat.

3. The method of vulcanizing articles of rubber which consists in placing an expansible bag adjacent the article within a mold, introducing a non-oxygen gas in a substantially dry condition and free from ingredients injurious to rubber into the gas bag from a minor storage supply of said gas which, in turn, is constantly replenished from a source of supply of always considerably greater volume than the amount required to fill said bag, inflating the gas bag with said gas to a predetermined pressure to cause said gas bag to force the article against the inner sides of the mold, applying vulcanizing heat, exhausting the gas from said gas bag after the vulcanization of said article is completed and returning the gas to the source of supply for re-use.

4. The method of vulcanizing articles of rubber which consists in placing an expansible bag adjacent the article within a mold, introducing carbon dioxide in a substantially dry condition and free from ingredients injurious to rubber into the said bag from a minor storage supply of carbon dioxide which, in turn, is constantly replenished from a source of supply of always considerably greater volume than the amount required to fill said bag, maintaining said source of supply under a substantially constant predetermined pressure, inflating the bag with said carbon dioxide, applying vulcanizing heat and maintaining said bag in communication with said source of supply during the application of the vulcanizing heat to thereby maintain said bag under constant pressure during the vulcanization of said article.

5. The method of vulcanizing articles of rubber which consists in placing an expansible bag adjacent the article within a mold, introducing carbon dioxide in a substantially dry condition and free from ingredients injurious to rubber into the said bag from a minor storage supply of carbon dioxide which, in turn, is constantly replenished from a source of supply of always considerably greater volume than the amount required to fill said bag, maintaining said source of supply under a substantially constant predetermined pressure, inflating the bag with said carbon dioxide, applying vulcanizing heat and maintaining said bag in communication with said source of supply during the application of the vulcanizing heat to thereby maintain said bag under constant pressure during the vulcanization of the article, exhausting the carbon dioxide from said bag after the vulcanization is completed and returning it to the source of supply for re-use.

6. An apparatus for supplying carbon dioxide under pressure to an expansible air bag for use in the vulcanization of articles of rubber comprising a gasometer, a compressor having its suction side connected with said gasometer, a plurality of receptacles the combined volume of which is considerably greater than the volume of said air bag connected with the pressure side of said compressor, and means adapted to connect said receptacles to said air bag to cause only a small quantity of carbon dioxide to be simultaneously withdrawn from each receptacle whereby the freezing effect upon the receptacles of the escape of a large volume of gas under pressure is avoided.

7. An apparatus for supplying carbon dioxide under pressure to an expansible air bag for use in the vulcanization of articles of rubber comprising a gasometer, a compressor having its suction side connected with said gasometer, storage means connected with the pressure side of the compressor for receiving and storing under pressure the gas delivered by said compressor, means for delivering the gas from said storage means to an air bag, and means for by-passing the gas from said compressor to prevent said compressor from building up the pressure within said storage means beyond a predetermined point.

8. An apparatus for supplying carbon dioxide under pressure to an expansible air bag for use in the vulcanization of articles of rubber comprising a gasometer, a compressor having its suction side connected with said gasometer, storage means connected with the pressure side of the compressor for receiving and storing under pressure the gas delivered by said compressor, means for delivering the gas from said storage means to an air bag and means to return the gas from the air bag to the compressor.

9. An apparatus for supplying carbon dioxide under pressure to an expansible air bag for use in the vulcanization of articles of rubber comprising a gasometer, a compressor having its suction side connected with said gasometer, a plurality of receptacles and an expansion tank connected with the pressure side of said compressor, and means to connect said expansion tank with an air bag.

10. An apparatus for supplying carbon dioxide under pressure to an expansible air bag for use in the vulcanization of articles of rubber comprising a gasometer, a compressor having its suction side connected with said gasometer, a plurality of receptacles and an expansion tank connected with the pressure side of said compressor, means to connect said expansion tank with an air bag, by-pass means to pass the gas from the pressure side of said compressor to storage, and means interposed in said by-pass means adapted to be automatically operated by a predetermined pressure to cause the by-pass to be operative.

11. An apparatus for supplying carbon dioxide under pressure to an expansible air bag for use in the vulcanization of articles of rubber comprising a gasometer, a compressor having its suction side connected with said gasometer, a plurality of receptacles and an expansion tank connected with the pressure side of said compressor, means to connect said expansion tank with an air bag, by-pass means to pass the gas from the pressure side of said compressor to storage means interposed in said by-pass means adapted to be automatically operated by a predetermined pressure to cause the by-pass to be operative, and additional by-pass means leading from said expansion tank to the gasometer.

12. An apparatus for supplying carbon dioxide under pressure to an expansible air bag for use in the vulcanization of articles of rubber comprising a gasometer, a compressor having its suction side connected with said gasometer, a plurality of receptacles and an expansion tank connected with the pressure side of said compressor, means to connect said expansion tank with an air bag, by-pass means to pass the gas from the pressure side of said compressor to storage, means interposed in said by-pass means adapted to be automatically operated by a predetermined pressure to cause the by-pass to be operative, and additional by-pass means leading from said expansion tank to the gasometer, and means automatically operated by a predetermined pressure within said expansion tank to cause said additional by-pass means to be operative.

13. An apparatus for supplying carbon dioxide under pressure to an expansible air bag for use in the vulcanization of articles of rubber comprising a gasometer, a compressor having its suction side connected with said gasometer, storage means connected with the pressure side of said compressor, a supply line leading from said storage means, a return line leading to the suction side of said compressor, means to connect said supply and return lines to an air bag, and means to selectively place said supply and return lines in communication with said last-named means.

14. Apparatus for supplying carbon dioxide to a vulcanizing mold for use in the vulcanization of articles of rubber comprising means for containing a major supply of pure carbon dioxide, means for containing a minor volume thereof, a valve passage from the latter adapted to be connected with the vulcanizing mold, and a connection between the two said means whereby, when a quantity of carbon dioxide is withdrawn from the minor volume for a vulcanizing operation, a quantity equivalent to the quantity withdrawn will be supplied to said minor volume from said major supply through said connection.

In testimony whereof I have hereunto set my hand.

HENRY R. MINOR.